Oct. 11, 1955 J. C. FOSTER 2,720,305
CASE FOR SPECTACLES AND THE LIKE
Filed Feb. 26, 1953 2 Sheets-Sheet 1

INVENTOR.
JOSEPH C. FOSTER
BY
ATTORNEY

Oct. 11, 1955 J. C. FOSTER 2,720,305
CASE FOR SPECTACLES AND THE LIKE
Filed Feb. 26, 1953 2 Sheets-Sheet 2
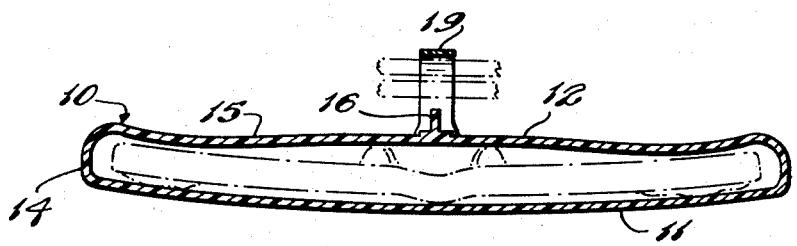
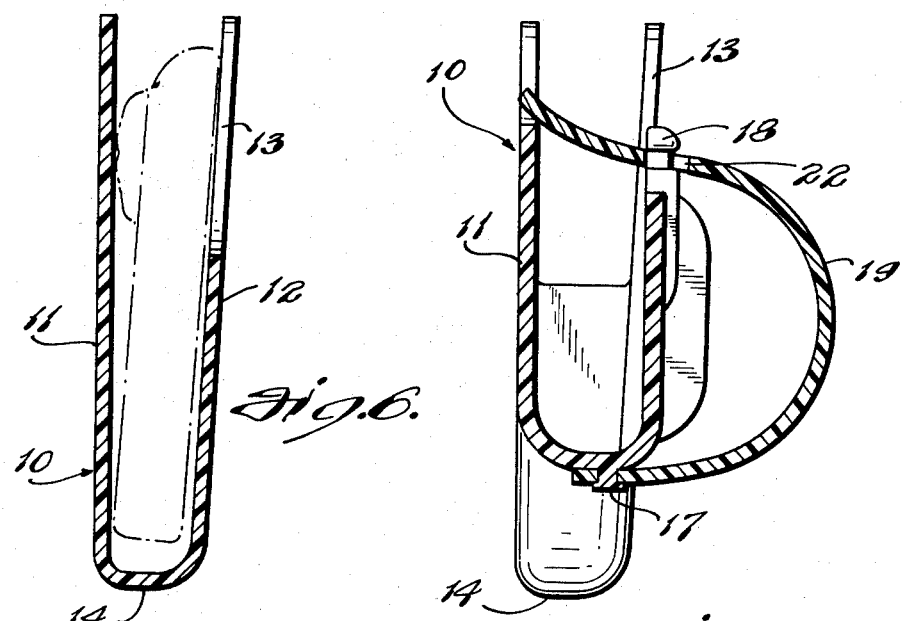
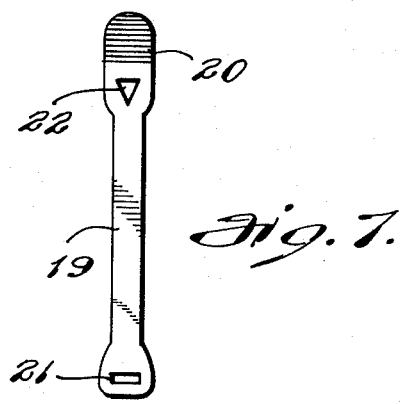
INVENTOR.
JOSEPH C. FOSTER
BY
ATTORNEY

United States Patent Office 2,720,305
Patented Oct. 11, 1955

2,720,305

CASE FOR SPECTACLES AND THE LIKE

Joseph C. Foster, Leominster, Mass., assignor to Foster Grant Co., Inc., Leominster, Mass., a corporation of Massachusetts Application February 26, 1953, Serial No. 339,100

1 Claim. (Cl. 206—5)

This invention relates to a case for spectacles and the like, and more particularly to a receptacle for containing and carrying sunglasses.

Among the objects of the invention are to provide a case that will safely and securely hold a pair of sunglasses or spectacles.

Another object is to provide a case that is strong, durable, and light in weight.

A further object is to provide a one-piece case of molded plastic material, the material preferably being transparent to permit of viewing the article held in the case.

A still further object of the invention is to provide a carrying case that will protect the lenses from being scratched.

Another object is to provide a case of simple construction that is inexpensive to manufacture.

Other objects and advantages of the invention will appear from the following description thereof, reference being had to the accompanying drawings, in which:

Fig. 4 is a longitudinal section taken on the line 4—4 of Fig. 1;

Fig. 5 is a vertical section taken on the line 5—5 of Fig. 1;

Fig. 6 is a vertical section on the line 6—6 of Fig. 2; and,

Fig. 7 is a plan view of the flexible strap or member for securing the temples or bows of the glasses.

Figure 1:
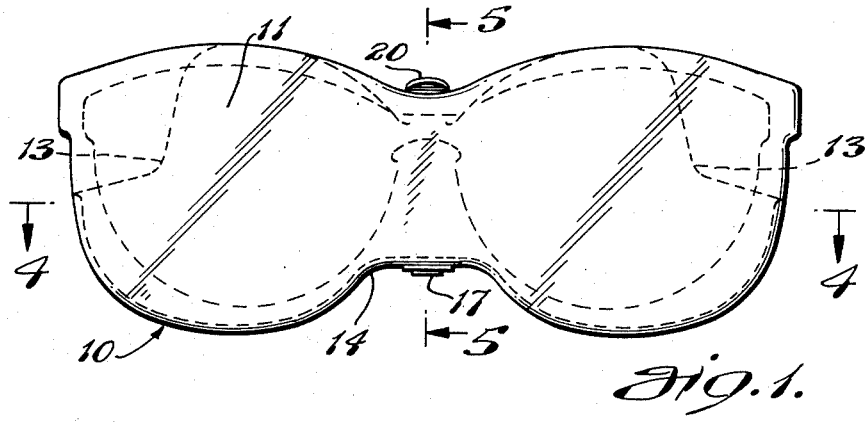
Figure 1 is a front view of the case with a pair of spectacles or sunglasses contained therein, the latter being shown in dotted lines.
Figure 2:
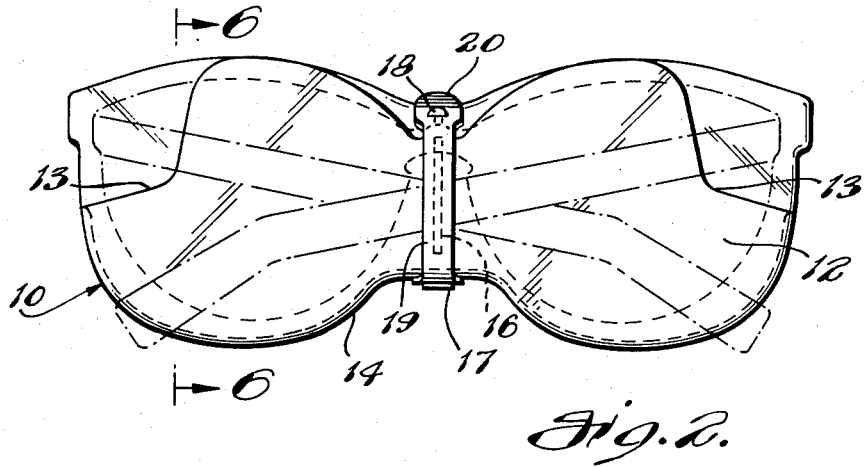
Fig. 2 is a rear view of the case with a pair of spectacles or sunglasses therein.
Figure 3:
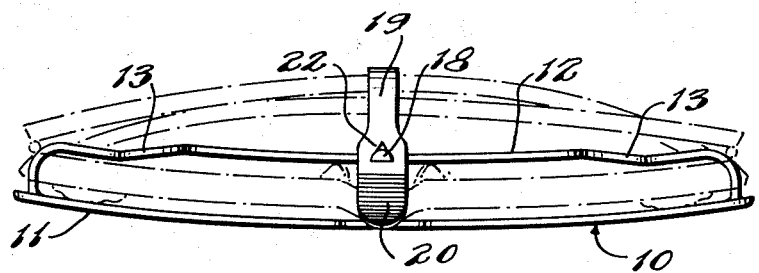
Fig. 3 is a top plan view.

The case 10 is made in one piece of molded plastic material, preferably by injection molding of polystyrene, which manner of molding permits of making the cases inexpensively in large quantities at a high production rate. The plastic material is preferably, though not necessarily, transparent.

The case 10 has a front wall 11 that is somewhat curved or arcuate in the direction of its length and that is shaped to conform generally to the configuration of the front of the frame of a pair of sunglasses or spectacles, and a rear wall 12. The space between the walls, in which the glasses are held, preferably tapers downwardly somewhat. Some sunglasses have protruding ornaments on the front of the frame, usually at the ends, while others are unornamented. The construction of the case permits of its use with either type. At each upper outer end of the rear wall is a recess or cut-out 13 to permit of passage of the temples or bows of the glasses. The front and rear walls of the case are integrally connected by a bottom wall 14 that extends upward to the lower ends of the recesses 13. The central portion 15 of each half of the rear wall is preferably slightly concave, as seen in Fig. 4, to afford a somewhat resilient hold on the frame of the glasses when inserted in the case.

The rear wall of the case may be formed with a vertical rib or projection 16 that strengthens the structure and over which the folded temples or bows cross when the glasses are inserted in the case.

At the center of the bottom of the case is a knob 17 which in this instance is substantially rectangular in shape, and at the top of the center of the rear wall 12 and extending upwardly therefrom substantially in line with the rib 16 is a knob or catch 18.

19 is a flexible strap which may be made of a flexible plastic, such as polyethelene, or any other suitable material, the upper end of which strap may have an enlarged finger grip portion 20 which is preferably ribbed or knurled for convenience of engagement with the fingers of the user of the case. The strap 19 has an opening 21 at its lower end to snap or fit tightly on the knob 17 at the bottom of the case, and thereby secure the strap fixedly to the bottom of the case. The strap has an opening 22 adjacent its upper end, which opening in the present instance is triangular in shape and is adapted to be snapped over and onto the knob 18 so as to be caught thereon. The strap passes over the folded temples or bows to hold them in such folded condition while the glasses are being carried in the case. When it is desired to remove the glasses the strap is unfastened and the glasses are withdrawn from the case.

While I have described and illustrated a preferred embodiment of the invention, it is to be understood that modifications may be made in the details thereof.

What I claim is:

A case for carrying spectacles and the like with their temples folded over its rear wall, said case comprising a one-piece open top receptacle of molded plastic material having spaced, elongated, substantially parallel front and rear walls, and a bottom wall, the front and rear walls being curved in their direction of length presenting a convexly curved front surface, the rear wall having recesses at its ends to permit of passage outward of the temples of the spectacles carried in the case, and a flexible strap having its ends secured to the case and passing over and across the rear wall for holding the folded temples against the case and the spectacles therein.

References Cited in the file of this patent

UNITED STATES PATENTS

| | | |
|---|---|---|
| D. 90,916 | Lafferty | Oct. 24, 1933 |
| 964,368 | Baldauf | July 12, 1910 |
| 2,499,332 | Schiff | Feb. 28, 1950 |
| 2,656,912 | Stegeman | Oct. 27, 1953 |